N. R. POLK.
HOOF TRIMMER.
APPLICATION FILED MAY 20, 1910.

973,298.

Patented Oct. 18, 1910.
2 SHEETS—SHEET 1.

Witnesses
J. H. Crawford,
John A. Donegan.

Inventor
Neal R. Polk,
By Victor J. Evans
Attorney

THE NORRIS PETERS CO., WASHINGTON, D. C.

N. R. POLK.
HOOF TRIMMER.
APPLICATION FILED MAY 20, 1910.
973,298.
Patented Oct. 18, 1910.
2 SHEETS—SHEET 2.
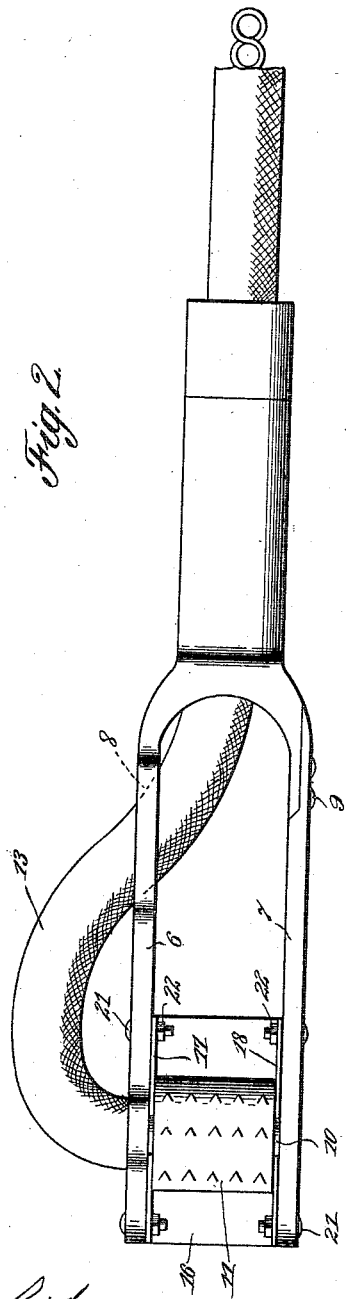
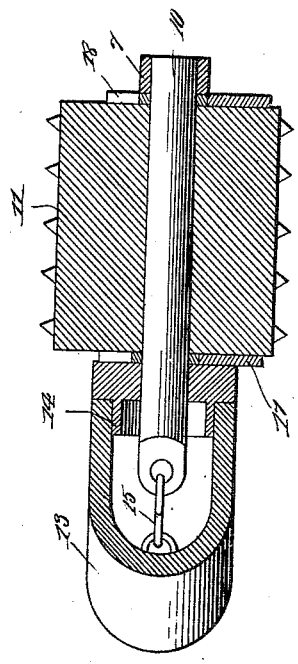
Witnesses
J. H. Crawford.
John A. Donegan.
Inventor
Neal R. Polk,
By Victor J. Evans
Attorney

UNITED STATES PATENT OFFICE.

NEAL R. POLK, OF GREENVILLE, TEXAS.

HOOF-TRIMMER.

973,298.

Specification of Letters Patent. Patented Oct. 18, 1910.

Application filed May 20, 1910. Serial No. 562,468.

*To all whom it may concern:*

Be it known that I, NEAL R. POLK, a citizen of the United States, residing at Greenville, in the county of Hunt and State of Texas, have invented new and useful Improvements in Hoof-Trimmers, of which the following is a specification.

This invention relates to improvements in hoof trimmers for trimming the hoofs of horses.

One object of the invention is the provision of a trimmer provided with a cylindrical rasp, and an adjustable gage serving to regulate the cutting depth of the teeth of the rasp.

Another object is the provision of a trimmer including a handle portion one end of which is provided with a U-shaped extension or frame and a flexible shaft extending through said handle and one side of said frame serving to impart movement to the rasp.

With these and other objects in view, which will more fully hereinafter appear, the present invention consists in certain novel details of construction and arrangement of parts, hereinafter fully described, illustrated in the accompanying drawings, and more particularly pointed out in the appended claims; it being understood that various changes in the form, proportion, size, and minor details of the device may be made, within the scope of the appended claims, without departing from the spirit or sacrificing any of the advantages of the invention.

Figure 1:
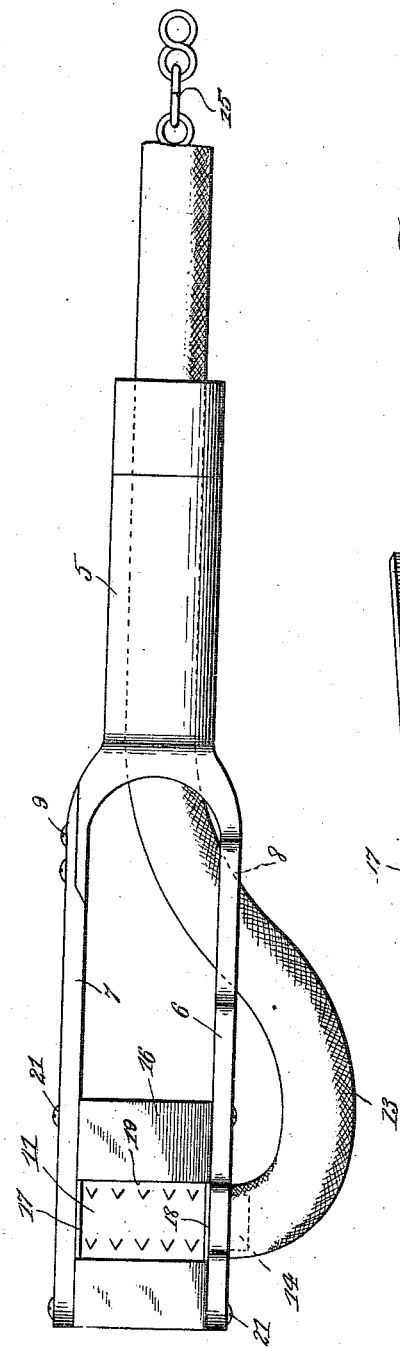
Figure 4:
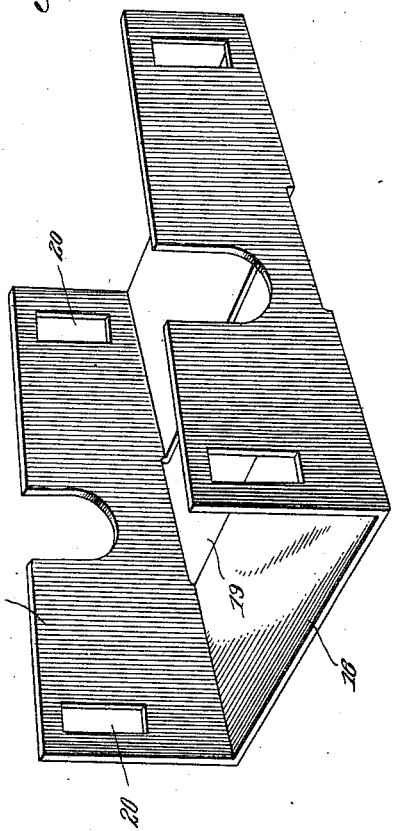

In the accompanying drawings, forming part of the specification;—Figure 1 is a front elevation of the device. Fig. 2 is a rear elevation thereof. Fig. 3 is a transverse sectional view taken through the frame. Fig. 4 is a detail perspective view of the gage.

Similar numerals of reference are employed to designate corresponding parts throughout.

The tubular handle is designated by the numeral 5 and may be of any convenient length and at one end terminates in a U-shaped extension comprising a frame, the sides of which are designated by the numerals 6 and 7. The side 6 is, at a point adjacent to its juncture with the handle 5 widened and provided with a transverse opening designated by the numeral 8. The opposite side 7 is in two sections united by screws or bolts as shown at 9. The sides 6 and 7 are, adjacent to their free ends provided with alining transverse openings, and journaled in said openings are the opposite end portions of a shaft 10. Keyed to the shaft between the sides 6 and 7 is a cylindrical member having a roughened surface and constituting a rasp 11.

The flexible tube 13 is passed through the handle 5 and thence through the opening 8 and has one end fixedly secured to a bushing 14 surrounding and spaced from one end of the shaft 10. Arranged in the tube 13 is a flexible shaft 15, one end of which is connected with one end of the shaft 10, while the opposite end is connected to a suitable motor or other driving means (not shown). With this construction it will be manifest that when rotary movement is imparted to the flexible shaft 15 the rasp will be rotated and when its roughened surface is brought to bear on a hoof of the animal it will operate to trim the said hoof.

In order to regulate the cutting depth of the teeth of the rasp what will subsequently be termed a gage is provided. This member is formed of a single piece of sheet metal and comprises an oblong bearing portion 16, from the opposite longitudinal sides of which rise side walls 17 and 18. The side walls 17 and 18 correspond in width approximately to one-half the diameter of the rasp 11, and at the medial portions of their longitudinal edges are provided with inwardly extending recesses to loosely receive the opposite end portions of the shaft 10. It might here be stated that the space between the opposite outer faces of the side walls 17 and 18 corresponds approximately to the space between the opposed inner faces of the sides 6 and 7 of the frame, so that when the sides 6 and 7 bear on the inner faces of the frame the bearing portion 16 will overlie the rasp 11. By reference now to the drawings it will be seen that the bearing portion 16 is medially provided with a transverse opening 19 somewhat less in width than the diameter of the rasp, thus enabling the teeth of the latter to project certain distances beyond the outer face of the bearing portion when the gage is properly positioned between the sides 6 and 7. In order that the gage may be adjustably secured to the sides of the frame the side walls 17 and 18 of the gage are, adjacent to their opposite ends provided with oblong slots 20 extending in the direction of the width of said side walls. The opposite sides 6 and 7 of the frame are provided with spaced openings to aline with the oblong slots 20, the said openings and slots receiving the shanks of adjusting screws 21, the said shanks having threaded thereon nuts 22 which bind on the inner faces of the side walls 17 and 18 and coöperate with the heads of the screws to secure the gage in any of its adjusted positions.

Thus it will be seen that when it is desired to trim a comparatively small portion from the hoof of a horse the gage is adjusted so that the edges of the teeth will be substantially in a plane with the outer face of the bearing portion 16. When the said bearing portion 16 bears on the hoof of the animal a rotary movement is imparted to the rasp in the manner before described and a shaving will be removed from the hoof. It will be obvious when it is desired to penetrate the hoof for a considerable depth that the same can be done by moving the gage in the opposite direction so that the bearing portion 16 thereof will be in a plane with the base of the teeth of the rasp.

I claim:—

1. A hoof trimmer comprising a tubular handle portion provided at one end with a U-shaped frame, a cylindrical rasp rotatably mounted in the free end portions of the sides of said frame, and a flexible shaft passing through the tubular handle and one side of said frame and connected to said rasp.

2. A hoof trimmer comprising a tubular handle terminating at one end in a U-shaped frame, a shaft journaled in the free end portions of the sides of said frame, a cylindrical rasp keyed to said shaft, a flexible shaft passing through said tubular handle and one side of said frame and connected to one end of the first-named shaft, a gage adjustably secured to the sides of said frame and provided with an opening overlying said rasp, for the purposes described.

In testimony whereof I affix my signature in presence of two witnesses.

NEAL R. POLK.

Witnesses:
J. P. Gunsany,
W. F. Balthrop.